US011239895B2

United States Patent
Jin et al.

(10) Patent No.: US 11,239,895 B2
(45) Date of Patent: Feb. 1, 2022

(54) DATA TRANSMISSION METHOD, TERMINAL DEVICE, AND NETWORK DEVICE

(71) Applicant: HUAWEI TECHNOLOGIES CO., LTD., Guangdong (CN)

(72) Inventors: Huangping Jin, Shanghai (CN); Wei Han, Shanghai (CN); Peng Shang, Shanghai (CN); Peng Jiang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 20 days.

(21) Appl. No.: 16/673,395

(22) Filed: Nov. 4, 2019

(65) Prior Publication Data
US 2020/0067588 A1    Feb. 27, 2020

Related U.S. Application Data

(63) Continuation of application No. PCT/CN2018/085439, filed on May 3, 2018.

(30) Foreign Application Priority Data

May 5, 2017    (CN) .......................... 201710310753.6

(51) Int. Cl.
*H04B 7/06*    (2006.01)
*H04B 7/0456*  (2017.01)

(52) U.S. Cl.
CPC ......... *H04B 7/0658* (2013.01); *H04B 7/0456* (2013.01); *H04B 7/0617* (2013.01); *H04B 7/0626* (2013.01)

(58) Field of Classification Search
CPC .. H04B 7/0658; H04B 7/0456; H04B 7/0417; H04B 7/0626; H04B 7/0673;
(Continued)

(56) References Cited

U.S. PATENT DOCUMENTS

2009/0252091 A1    10/2009  Tang et al.
2013/0003788 A1*   1/2013   Marinier ................ H04B 7/024
                                                375/219
(Continued)

FOREIGN PATENT DOCUMENTS

| CN | 101986588 A  | 3/2011 |
|----|--------------|--------|
| CN | 106507486 A  | 3/2017 |
| WO | 2013050449 A1| 4/2013 |

*Primary Examiner* — Phong La

(74) *Attorney, Agent, or Firm* — Womble Bond Dickinson (US) LLP

(57) ABSTRACT

This application describes a data transmission method, a terminal device, and a network device. The method may include determining, by a terminal device, a reporting type of channel state information (CSI), where the reporting type is used to indicate a relationship between CSI of a beam that is currently reported by the terminal device and CSI of a beam that is previously reported by the terminal device in a current reporting period. The method may also include sending, by the terminal device, CSI of N beams to a network device based on a reporting type and a codebook parameter, where the codebook parameter is used to indicate a quantity N of the currently reported beams, and N is an integer greater than or equal to 1. According to the data transmission method, the terminal device, and the network device described in the embodiments of this application, CSI reporting flexibility can be improved, thereby improving system performance.

29 Claims, 4 Drawing Sheets

(58) Field of Classification Search
CPC .. H04B 7/0665; H04B 7/0636; H04B 7/0639; H04B 7/063; H04B 7/0617; H04B 7/0619; H04B 7/0608; H04B 7/0478; H04B 7/0483; H04B 7/0486; H04L 1/0001
USPC .......................................................... 370/329
See application file for complete search history.

(56) References Cited

U.S. PATENT DOCUMENTS

| | | | |
|---|---|---|---|
| 2013/0188591 A1* | 7/2013 | Ko .................... | H04B 7/0639 370/329 |
| 2013/0235742 A1 | 9/2013 | Josiam et al. | |
| 2017/0048863 A1 | 2/2017 | Tsai et al. | |
| 2017/0070277 A1* | 3/2017 | Si ..................... | H04B 7/0456 |
| 2017/0310441 A1* | 10/2017 | Wei ................... | H04B 7/0486 |
| 2018/0034519 A1* | 2/2018 | Rahman ............. | H04B 7/0452 |
| 2018/0091992 A1* | 3/2018 | Frenne ............... | H04B 7/0626 |
| 2018/0167116 A1* | 6/2018 | Rahman ............. | H04B 7/06 |
| 2018/0183503 A1* | 6/2018 | Rahman ............. | H04W 72/042 |
| 2018/0234153 A1* | 8/2018 | Lincoln .............. | H04W 24/10 |
| 2018/0343046 A1* | 11/2018 | Park .................. | H04B 7/0456 |
| 2019/0068266 A1* | 2/2019 | Chang ............... | H04B 7/0639 |
| 2019/0116594 A1* | 4/2019 | Kwak ................ | H04L 5/0044 |
| 2019/0141559 A1* | 5/2019 | Tang ................. | H04B 7/0621 |
| 2020/0068416 A1* | 2/2020 | Kang ................. | H04L 5/0023 |
| 2021/0076246 A1* | 3/2021 | Tang ................. | H04B 7/0621 |

\* cited by examiner

DATA TRANSMISSION METHOD, TERMINAL DEVICE, AND NETWORK DEVICE

CROSS-REFERENCE TO RELATED APPLICATIONS

This application is a continuation of International Application No. PCT/CN2018/085439, filed on May 3, 2018, which claims priority to Chinese Patent Application No. 201710310753.6, filed on May 5, 2017. The disclosures of the aforementioned applications are hereby incorporated by reference in their entireties.

TECHNICAL FIELD

This application relates to the communications field, and in particular, to a data transmission method, a terminal device, and a network device in the communications field.

BACKGROUND

A multiple-input multiple-output (MIMO) technology is that a plurality of transmit antennas and receive antennas are respectively used at a transmit end and a receive end, to transmit and receive signals by using the plurality of antennas respectively at the transmit end and the receive end. With development of a multiple-antenna technology, a massive multiple-input multiple-output (Massive MIMO) becomes an effective means for improving a system capacity. In a massive MIMO system, dozens or even hundreds of antennas may be configured for a network device, to simultaneously send different data streams to dozens of users by using a same time-frequency resource, thereby significantly improving spectrum efficiency.

Channel state information (CSI) is used to indicate a channel attribute of a communications link, and accuracy of CSI obtained by the network device determines performance of the massive MIMO system to a great extent. Usually, in a frequency division duplex (FDD) system or in a time division duplex (TDD) system in which channel reciprocity cannot be well met, a terminal device needs to evaluate the CSI, quantize the CSI by using a codebook, and report the CSI to the network device. To implement high-precision CSI reporting (e.g., CSI reporting), a beam combination reporting technology may be used. The terminal device may perform weighted combination on a plurality of code words, to compensate for a precision loss of a single code word.

When the beam combination reporting technology is used, a plurality of pieces of beam location information and coefficient quantization information thereof need to be reported. Consequently, overheads are high. Currently, in a typical method for reducing feedback overheads, overheads are reduced by hierarchically reporting the CSI. When the beam combination reporting technology is used, the terminal device reports to-be-reported CSI of a plurality of beams at T moments, and reports CSI of N beams at each moment, and finally aggregates CSI of L=T*N beams to obtain final CSI information, where both T and N are integers greater than 0. In an existing CSI hierarchical reporting method, a beam whose CSI is reported at each of the T moments is preconfigured, and the network device and the terminal device cannot change reported CSI content. Therefore, how to improve CSI reporting flexibility becomes a technical problem to be urgently resolved.

SUMMARY

According to a data transmission method, a terminal device, and a network device that are provided in embodiments of this application, CSI reporting flexibility can be improved, thereby improving system performance.

According to a first aspect, a data transmission method is provided. The method includes: determining, by a terminal device, a reporting type of channel state information (CSI), where the reporting type is used to indicate a relationship between CSI of a beam that is currently reported by the terminal device and CSI of a beam that is previously reported by the terminal device in a current reporting period; and sending, by the terminal device, CSI of N beams to a network device based on the reporting type and the codebook parameter, where the codebook parameter is used to indicate a quantity N of the currently reported beams, and N is an integer greater than or equal to 1.

Specifically, in embodiments, the network device may send a reference signal to the terminal device, to measure a channel state. After receiving the reference signal sent by the network device, the terminal device may feed back CSI of at least one beam to the network device, and the network device processes the CSI of the beam that is received, to obtain a measurement result. Optionally, the reference signal may be a channel state information-reference signal (CSI-RS). However, this is not limited in this embodiment of this application.

In this embodiment of this application, before the terminal device reports the CSI to the network device, the terminal device and the network device need to determine the reporting type of the CSI. The reporting type is used to indicate the relationship between the CSI of the beam that is currently reported by the terminal device and the CSI of the beam that is previously reported by the terminal device in the current reporting period. In addition, the terminal device and the network device may further determine the codebook parameter used to indicate the quantity N of the currently reported beams. The codebook parameter may be agreed on in advance, or may be negotiated by the network device and the terminal device before the CSI is reported each time. This is not limited in this embodiment of this application. The terminal device selects the CSI of the N beams based on the determined reporting type of the CSI and the determined codebook parameter, and feeds back the CSI of the N beams to the network device. The network device receives the CSI of the N beams that is fed back by the terminal device, and determines a measurement result, to be specific, a current channel state of a downlink channel, based on the reporting type of the CSI.

According to the data transmission method in this embodiment of this application, the terminal device and the network device negotiate the reporting type of the CSI, so that the terminal device can send the CSI corresponding to the negotiated reporting type to the network device, and the network device or the terminal device can adjust, based on an actual situation, the currently reported CSI, to meet a continuously changing requirement for the channel, thereby improving CSI reporting flexibility and improving system performance.

In a first possible embodiment of the first aspect, the reporting type is any one of the following types: a first type, a second type, and a third type, where the first type is used to indicate that the currently reported CSI is CSI in a new reporting period, the second type is used to indicate that the currently reported CSI is incremental information of the CSI of the beam that is previously reported; and the third type is used to indicate that the currently reported CSI is update information of the CSI of the beam that is previously reported.

Specifically, in embodiments described in this specification, the first type, the second type, and the third type may be respectively referred to as an independent type, an enhanced type, and an update type. The independent type is used to indicate that the terminal device starts new CSI reporting. If the channel state is changed or the network device needs to instruct the terminal device to re-initiate to report the CSI, the reporting type corresponding to the CSI currently reported by the terminal device may be the independent type. The enhanced type is used to indicate that the CSI reported by the terminal device at the current moment is incremental information of the previously reported CSI, to be specific, information of basic CSI has been reported by the terminal device, and the currently reported CSI is information of enhanced CSI and is used to supplement the information of the basic CSI, to improve CSI reporting precision. The update type is used to indicate that the terminal device needs to update a part of the previously reported CSI. If the channel is partially changed, the reporting type corresponding to the CSI currently reported by the terminal device may be the update type.

Based on the foregoing different reporting types, the CSI reported by the terminal device may be changed in real time. When the channel is not changed, the terminal device may report the information of the basic CSI, report the information of the enhanced CSI on this basis, and indicate to the network device that a corresponding reporting type is the enhanced type, thereby improving the CSI reporting precision. Once the channel is changed, the terminal device may trigger new CSI reporting, or update the CSI of the beam that is currently reported, and indicate to the network device that a corresponding reporting type is the independent type or the update type, thereby improving CSI reporting accuracy.

With reference to the foregoing possible embodiment of the first aspect, in a second possible embodiment of the first aspect, before the sending, by the terminal device, CSI of N beams to a network device based on the reporting type and a codebook parameter, the method further includes: determining, by the terminal device, the codebook parameter; and determining, by the terminal device, the currently reported N beams based on the reporting type and the codebook parameter.

Specifically, in embodiments, before reporting the CSI each time, the terminal device needs to determine a beam used to report the CSI at the current moment. The terminal device may determine a quantity of pieces of CSI that needs to be reported at the current moment based on the codebook parameter, and then determine, based on the reporting type, a specific beam used for reporting the CSI.

With reference to the foregoing possible embodiments of the first aspect, in a third possible embodiment of the first aspect, the determining, by the terminal device, the currently reported N beams based on the reporting type and the codebook parameter includes: if the reporting type is the first type, determining, by the terminal device, to start to report CSI in a new reporting period, and determining beams corresponding to N pieces of CSI as the N beams; if the reporting type is the second type, determining, by the terminal device, beams corresponding to N pieces of CSI in CSI that is not reported in the current reporting period as the N beams; or if the reporting type is the third type, determining, by the terminal device, beams corresponding to N pieces of CSI that need to be updated in CSI that is already reported in the current reporting period as the N beams.

It should be understood that the foregoing reporting type of the CSI is negotiated by the network device and the terminal device together before the terminal device reports the CSI each time, to be specific, the reporting type of the CSI that is determined by the network device needs to be the same as that determined by the terminal device. In this way, the CSI reported by the terminal device can be correctly processed by the terminal device. In this embodiment of this application, the network device and the terminal device may determine the reporting type of the CSI in a plurality of manners. Specifically, the reporting type may be determined by the terminal device and notified to the network device, or may be determined by the network device and notified to the terminal device. This is not limited in this embodiment of this application.

With reference to the foregoing possible embodiments of the first aspect, in a fourth possible embodiment of the first aspect, the determining, by a terminal device, a reporting type of channel state information (CSI) includes: determining, by the terminal device, the reporting type based on the downlink channel state; and the method further includes: sending, by the terminal device to the network device based on the reporting type, a flag bit used to indicate the reporting type.

Specifically, in embodiments, the terminal device may determine the foregoing reporting type based on the downlink channel state. For example, if the downlink channel is greatly changed, the terminal device may determine that the reporting type is the first type; if the downlink channel is not changed, the terminal device may determine that the reporting type is the second type; or if the downlink channel is slightly changed, the terminal device may determine that the reporting type is the third type. After determining the reporting type, the terminal device may send the reporting type to the network device, and the network device receives the reporting type sent by the terminal device, to determine the reporting type of the CSI currently reported by the terminal device, and correctly process the CSI.

In a possible embodiment, the terminal device may send the flag bit to the network device, to indicate the reporting type of the currently reported CSI, where there is a preset correspondence between the flag bit and the reporting type.

With reference to the foregoing possible embodiments of the first aspect, in a fifth possible embodiment of the first aspect, before the sending, by the terminal device, CSI of N beams to a network device based on the reporting type and a codebook parameter, the method further includes: when the reporting type is the first type or the second type, receiving, by the terminal device, a flag bit sent by the network device, where the flag bit is used to indicate the reporting type; and determining, by the terminal device, the reporting type based on the flag bit.

Specifically, in embodiments, the network device may determine the foregoing reporting type based on the CSI of the beam that is previously reported by the terminal device in the current reporting period. For example, if the network device determines that the previously reported CSI is useless, new CSI reporting needs to be started, and the network device may determine that the reporting type is the first type; or if the network device determines that the previously reported CSI is inaccurate, the network device may determine that the reporting type is the second type. After determining the reporting type, the network device may send the reporting type to the terminal device, and the terminal device receives the reporting type sent by the network device, to determine the reporting type of the CSI currently reported by the terminal device, and select correct CSI for reporting.

In a possible embodiment, the network device may send the flag bit to the terminal device, to indicate the reporting type of the currently reported CSI, where there is a preset correspondence between the flag bit and the reporting type.

With reference to the foregoing possible embodiments of the first aspect, in a sixth possible embodiment of the first aspect, the determining, by the terminal device, the codebook parameter includes: when the reporting type is the first type or the second type, receiving, by the terminal device, the codebook parameter sent by the network device.

With reference to the foregoing possible embodiments of the first aspect, in a seventh possible embodiment of the first aspect, after the determining, by the terminal device, the codebook parameter, the method further includes: sending, by the terminal device, the codebook parameter to the network device.

Specifically, in embodiments, when the CSI is reported by using a codebook, the terminal device and the network device not only need to determine the reporting type of the current CSI, but also need to determine the codebook parameter used by the currently reported CSI. The codebook parameter may be determined by the network device and notified to the terminal device, and alternatively, may be determined by the terminal device and notified to the network device. This is not limited in the embodiment of this application.

It should be understood that only when the reporting type is the first type or the second type, the network device can actively change reported CSI content, to be specific, actively determine the reporting type of the CSI and the codebook parameter, and send the reporting type of the CSI and the codebook parameter to the terminal device. However, when the reporting type is the update type, because the network device cannot learn of the channel state, only the terminal device can actively initiate CSI reporting of the third type. In this case, the codebook parameter corresponding to the third type can be determined by only the terminal device, and notified to the network device.

With reference to the foregoing possible embodiments of the first aspect, in an eighth possible embodiment of the first aspect, the CSI includes at least one of the following information: a precoding matrix indicator PMI, a rank indication RI, and a channel quality indication CQI.

According to a second aspect, another data transmission method is provided. The method includes: determining, by a network device, a reporting type of channel state information (CSI) of a terminal device, where the reporting type is used to indicate a relationship between CSI of a beam that is currently reported by the terminal device and CSI of a beam that is previously reported by the terminal device in a current reporting period; receiving, by the network device, CSI of N beams that is sent by the terminal device, where N is an integer greater than or equal to 1; and determining, by the network device, a current channel state of a downlink channel based on a codebook parameter, the reporting type, and the CSI of the N beams, where the codebook parameter is used to indicate a quantity N of beams currently reported by the terminal device.

According to the data transmission method in this embodiment of this application, the terminal device and the network device negotiate the reporting type of the CSI, so that the terminal device can send the CSI corresponding to the negotiated reporting type to the network device, and the network device or the terminal device can adjust, based on an actual situation, the currently reported CSI, to meet a continuously changing requirement for the channel, thereby improving CSI reporting flexibility and improving system performance.

In a first possible embodiment of the second aspect, the reporting type is any one of the following types: a first type, a second type, and a third type, where the first type is used to indicate that the currently reported CSI is CSI in a new reporting period, the second type is used to indicate that the currently reported CSI is incremental information of the CSI of the beam that is previously reported; and the third type is used to indicate that the currently reported CSI is update information of the CSI of the beam that is previously reported.

With reference to the foregoing possible embodiment of the second aspect, in a second possible embodiment of the second aspect, the determining, by the network device, a current channel state of a downlink channel based on the reporting type, a codebook parameter, and the CSI of the N beams includes: if the reporting type is the first type, determining, by the network device, that the terminal device starts a new reporting period, and determining the current channel state based on the CSI of the N beams; if the reporting type is the second type, aggregating, by the network device, the CSI of the N beams and CSI of a beam that is already reported in the current reporting period, to obtain the current channel state; or if the reporting type is the third type, updating, by the network device, CSI of N beams that is already reported in the current reporting period to the CSI of the N beams that is currently reported by the terminal device, and determining the current channel state based on the updated CSI of the beams.

With reference to the foregoing possible embodiments of the second aspect, in a third possible embodiment of the second aspect, the determining, by a network device, a reporting type of channel state information (CSI) of a terminal device includes: when the reporting type is the first type or the second type, determining, by the network device, the reporting type based on the CSI of the beam that is previously reported; and the method further includes: sending, by the network device to the terminal device based on the reporting type, a flag bit used to indicate the reporting type.

With reference to the foregoing possible embodiments of the second aspect, in a fourth possible embodiment of the second aspect, the determining, by a network device, a reporting type of channel state information (CSI) of a terminal device includes: receiving, by the network device, a flag bit sent by the terminal device, where the flag bit is used to indicate the reporting type; and determining, by the network device, the reporting type based on the flag bit.

With reference to the foregoing possible embodiments of the second aspect, in a fifth possible embodiment of the second aspect, before the determining, by the network device, a current channel state of a downlink channel based on a codebook parameter, the reporting type, and the CSI of the N beams, the method further includes: determining, by the network device, the codebook parameter; and sending, by the network device, the codebook parameter to the terminal device when the reporting type is the first type or the second type.

With reference to the foregoing possible embodiments of the second aspect, in a sixth possible embodiment of the second aspect, before the determining, by the network device, a current channel state of a downlink channel based on a codebook parameter, the reporting type, and the CSI of the N beams, the method further includes: receiving, by the network device, the codebook parameter sent by the terminal device.

With reference to the foregoing possible embodiments of the second aspect, in a seventh possible embodiment of the second aspect, the CSI includes at least one of the following information: a precoding matrix indicator PMI, a rank indication RI, and a channel quality indication CQI.

According to a third aspect, a terminal device is provided and is configured to perform the method according to any one of the first aspect or the possible embodiments of the first aspect. Specifically, the terminal device includes units configured to perform the method according to any one of the first aspect or the possible embodiments of the first aspect.

According to a fourth aspect, a network device is provided and is configured to perform the method according to any one of the second aspect or the possible embodiments of the second aspect. Specifically, the network device includes units configured to perform the method according to any one of the second aspect or the possible embodiments of the second aspect.

According to a fifth aspect, a terminal device is provided and includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal, and control a transmitter to send a signal. In addition, when the processor executes the instruction stored in the memory, the execution enables the terminal device to perform the method according to any one of the first aspect or the possible embodiments of the first aspect.

According to a sixth aspect, a network device is provided and includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal, and control a transmitter to send a signal. In addition, when the processor executes the instruction stored in the memory, the execution enables the network device to perform the method according to any one of the second aspect or the possible embodiments of the second aspect.

According to a seventh aspect, a data transmission system is provided. The system includes the terminal device according to any one of the third aspect or the possible embodiments of the third aspect and the network device according to any one of the fourth aspect or the possible embodiments of the fourth aspect; or the system includes the terminal device according to any one of the fifth aspect or the possible embodiments of the fifth aspect and the network device according to any one of the sixth aspect or the possible embodiments of the sixth aspect.

According to an eighth aspect, a computer program product is provided and includes computer program code. When the computer program code is run by a terminal device, the terminal device is enabled to perform the method according to any one of the first aspect or the possible embodiments of the first aspect.

According to a ninth aspect, a computer program product is provided and includes computer program code. When the computer program code is run by a network device, the network device is enabled to perform the method according to any one of the second aspect or the possible embodiments of the second aspect.

According to a tenth aspect, a computer readable medium is provided and is configured to store a computer program. The computer program includes an instruction used to perform the method according to any one of the first aspect or the possible embodiments of the first aspect.

According to an eleventh aspect, a computer readable medium is provided and is configured to store a computer program. The computer program includes an instruction used to perform the method according to any one of the second aspect or the possible embodiments of the second aspect.

DESCRIPTION OF EMBODIMENTS

Figure 1:
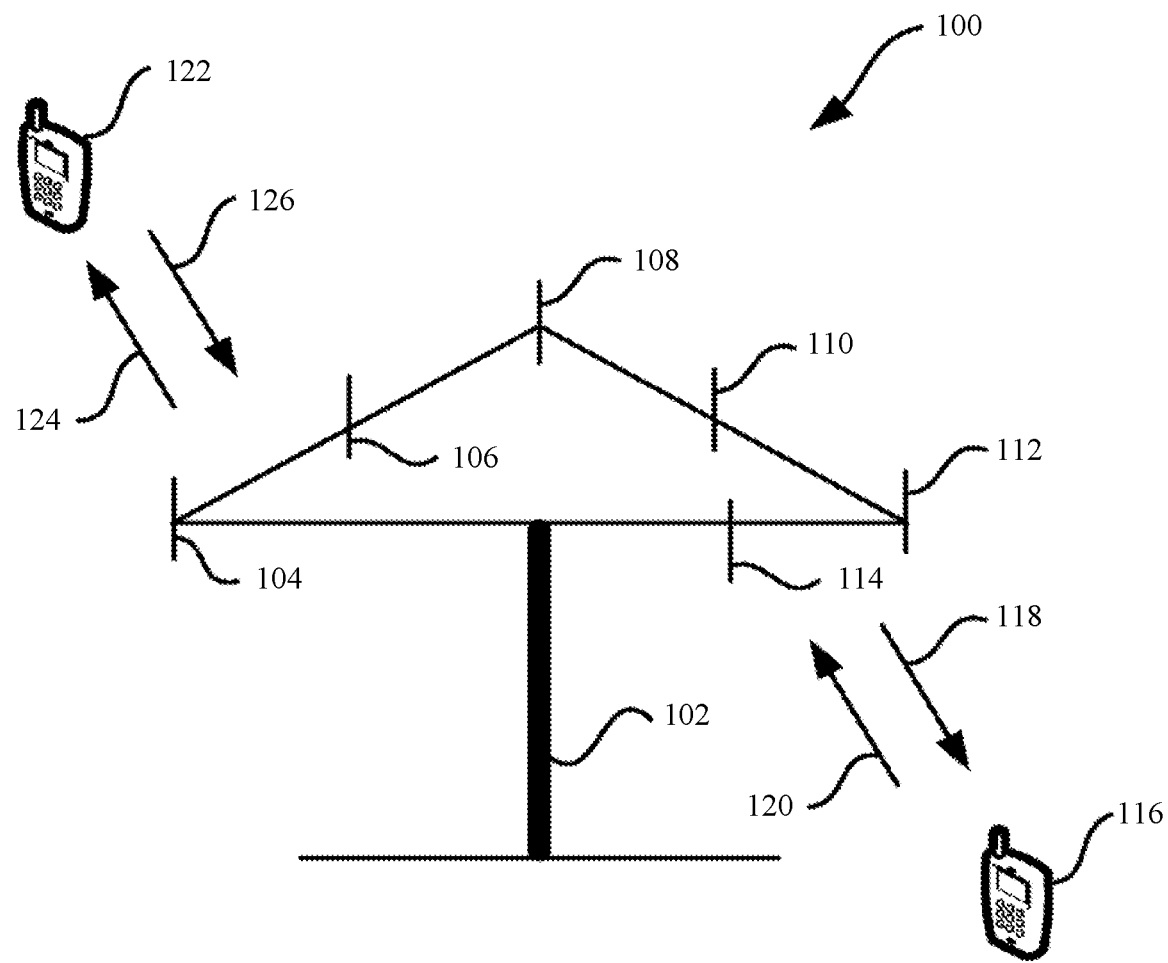
FIG. 1 is a schematic diagram of a communications system according to an embodiment of this application.

The following describes the technical solutions in embodiments of this application with reference to the accompanying drawings in the embodiments of this application.

It should be understood that, the technical solutions in the embodiments of this application may be applied to various communications systems, such as: a global system for mobile communications GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future fifth generation (5G) communications system.

It should be further understood that the technical solutions in the embodiments of this application may be further applied to various non-orthogonal multiple access technology-based communications systems, for example, a sparse code multiple access (SCMA) system. Certainly, SCMA may also be referred to as another name in the communications field. Further, the technical solutions in the embodiments of this application may be applied to a multi-carrier transmission system using the non-orthogonal multiple access technology, for example, an orthogonal frequency division multiplexing (OFDM) system, a filter bank multi-carrier (FBMC) system, a generalized frequency division multiplexing (GFDM) system, or a filtered orthogonal frequency division multiplexing (e.g., referred to herein as filtered-OFDM or F-OFDM) system that uses the non-orthogonal multiple access technology.

It should also be understood that, a terminal device in the embodiments of this application may communicate with one or more core networks by using a radio access network (RAN), and the terminal device may be referred to as an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN), or the like.

It should be further understood that in the embodiments of this application, a network device may be configured to communicate with a terminal device. The network device may be a base transceiver station (base transceiver station, BTS) in a GSM system or a CDMA system, may be a NodeB (e.g., referred to herein as a Node B or a NB) in a WCDMA system, or may be an evolved NodeB (e.g., referred to herein as an evolved node B, eNB, or eNodeB) in an LTE system. Alternatively, the network device may be a relay station, an access point, an in-vehicle device, a wearable device, a network-side device in a future 5G network, or a network device in a future evolved PLMN network, or the like.

The embodiments of this application may be applicable to an LTE system and a subsequent evolved system such as 5G, or other wireless communications systems using various radio access technologies, for example, systems using access technologies such as code division multiple access, frequency division multiple access, time division multiple access, orthogonal frequency division multiple access, and single carrier frequency division multiple access, and particularly applicable to a scenario in which channel information needs to be fed back and/or a two-stage precoding technology needs to be used, for example, a wireless network using a massive MIMO technology or a wireless network using a distributed antenna technology.

It should be understood that a MIMO technology is that a plurality of transmit antennas and receive antennas are respectively used at a transmit end and a receive end, to transmit and receive signals by using the plurality of antennas respectively at the transmit end and the receive end, thereby improving communication quality. In the technology, spatial resources can be fully used, and multiple-output multiple-input is implemented by using the plurality of antennas, so that a system channel capacity can be increased by multiple times without increasing a spectrum resource and an antenna transmit power.

MIMO may be classified into single-user multiple-input multiple-output (SU-MIMO) and multi-user multiple-input multiple-output (MU-MIMO). In massive MIMO, based on a multi-user beamforming principle, several hundreds of antennas are arranged at a transmit end device, to modulate respective beams for dozens of target receivers, and transmit dozens of signals simultaneously on a same frequency resource through spatial signal isolation. Therefore, in the massive MIMO technology, spatial freedom brought by configuring large-scale antennas can be fully used, so that spectral efficiency is improved.

FIG. 1 is a schematic diagram of a communications system 100 used in an embodiment of this application. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. Two antennas are shown for each antenna group in FIG. 1. However, more or fewer antennas may be used for each group. The network device 102 may additionally include a transmitter chain and a receiver chain. A person of ordinary skill in the art may understand that the transmitter chain and the receiver chain may both include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that the network device 102 may communicate with any quantity of terminal devices that are similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a common frequency band, and the forward link 124 and the reverse link 126 may use a common frequency band.

Each antenna group and/or area designed for communication is referred to as a sector of the network device 102. For example, the antenna group may be designed to communicate with a terminal device in a sector in a coverage area of the network device 102. In a process in which the network device 102 separately communicates with the terminal devices 116 and 122 by using the forward links 118 and 124, a transmit antenna of the network device 102 can improve signal-to-noise ratios of the forward links 118 and 124 through beamforming. In addition, compared with a manner in which a network device sends a signal to all terminal devices of the network device by using a single antenna, when the network device 102 sends, through beamforming, a signal to the terminal devices 116 and 122 that are randomly scattered within a related coverage area, a mobile device in a neighboring cell suffers relatively weak interference.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain a specific quantity of data bits to be sent to the wireless communications receiving apparatus through a channel. For example, the wireless communications sending apparatus may generate, receive from another communications apparatus, or store in a memory, the specific quantity of data bits to be sent to the wireless communications receiving apparatus through the channel. The data bits may be included in a transport block or a plurality of transport blocks of the data, and the transport block may be segmented to generate a plurality of code blocks.

In addition, the communications system 100 may be a public land mobile network PLMN, a device-to-device (D2D) network, a machine-to-machine (M2M) network, or another network. FIG. 1 is merely an example of a simplified schematic diagram for ease of understanding, and the network may further include another network device that is not shown in FIG. 1.

Figure 2:
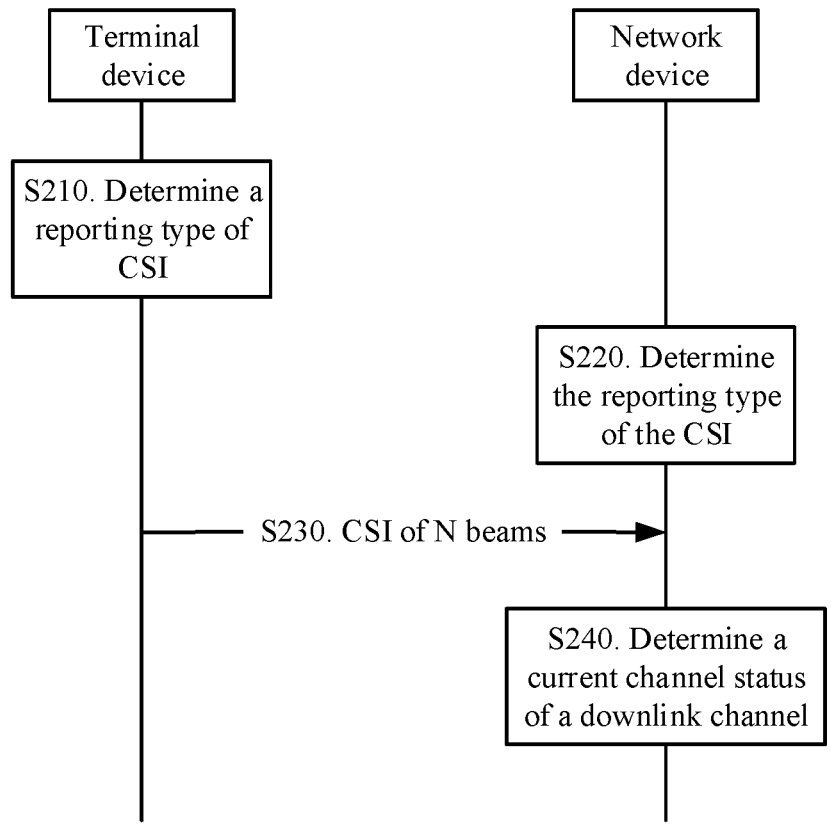
FIG. 2 is a schematic flowchart of a data transmission method according to an embodiment of this application.

FIG. 2 is a schematic flowchart of a data transmission method 200 according to an embodiment of this application. The method 200 may be applied to the communications system 100 shown in FIG. 1. However, this embodiment of this application is not limited thereto.

S210. A terminal device determines a reporting type of channel state information (CSI), where the reporting type is used to indicate a relationship between CSI of a beam that is currently reported by the terminal device and CSI of a beam that is previously reported the terminal device in a current reporting period.

S220. A network device determines the reporting type of the channel state information (CSI) of the terminal device.

S230. The terminal device sends CSI of N beams to the network device based on the reporting type and a codebook parameter, where the codebook parameter is used to indicate a quantity N of the currently reported beams, and N is an integer greater than or equal to 1.

Correspondingly, the network device receives the CSI of the N beams that is sent by the terminal device.

S240. The network device determines a current channel state of a downlink channel based on the reporting type, the codebook parameter, and the CSI of the N beams.

For a codebook-based beamforming technology, selection of a codebook thereof mainly depends on the channel state information (CSI). In a slow time-varying time division duplex TDD system, the network device may obtain, by using a dual-channel feature, downlink CSI based on estimation on an uplink channel. However, in a frequency division duplex FDD system or a time division duplex TDD system with poor channel reciprocity, because uplink and downlink channels are asymmetric, the downlink CSI can be estimated by using only the terminal device, and then feedback is performed by using the uplink channel. Specifically, the network device may send a reference signal to the terminal device, to measure a channel state. After receiving the reference signal sent by the network device, the terminal device may feed back CSI of at least one beam to the network device, and the network device processes the CSI of the beam that is received, to obtain a measurement result.

In an optional embodiment, the reference signal may be a channel state information-reference signal (CSI-RS). However, this is not limited in this embodiment of this application.

In this embodiment of this application, before the terminal device reports the CSI to the network device, the terminal device and the network device need to determine the reporting type of the CSI. The reporting type is used to indicate the relationship between the CSI of the beam that is currently reported by the terminal device and the CSI of the beam that is previously reported by the terminal device in the current reporting period. In addition, the terminal device and the network device may further determine the codebook parameter used to indicate the quantity N of the currently reported beams. The codebook parameter may be agreed on in advance, or may be negotiated by the network device and the terminal device before the CSI is reported each time. This is not limited in this embodiment of this application. The terminal device selects the CSI of the N beams based on the determined reporting type of the CSI and the determined codebook parameter, and feeds back the CSI of the N beams to the network device. The network device receives the CSI of the N beams that is fed back by the terminal device, and determines a measurement result, to be specific, the current channel state of the downlink channel, based on the reporting type of the CSI.

In an existing CSI hierarchical reporting method, before the CSI is reported, the network device and the terminal device may preconfigure beam information that needs to be reported at next T moments. To be specific, in a reporting period, a plurality of reporting moments of the CSI and beam information reported at each moment may be preconfigured for the terminal device. Because a beam whose CSI is reported at each of the T moments is preconfigured, the network device and the terminal device cannot change reported CSI content.

According to the data transmission method in this embodiment of this application, the terminal device and the network device negotiate the reporting type of the CSI, so that the terminal device can send the CSI corresponding to the negotiated reporting type to the network device, and the network device or the terminal device can adjust, based on an actual situation, the currently reported CSI, to meet a continuously changing requirement for the channel, thereby improving CSI reporting flexibility and improving system performance.

In an implementation for example, based on a high-precision CSI feedback in a beam combination mechanism, a codebook used to indicate the CSI fed back by the terminal device may be represented as a two-level codebook structure, and is usually expressed as:

$W = W_1 \times W_2$ $W_1 = [b_1 \ b_2 \ \Lambda b_K]$ represents a quantity K of bases (beams) selected from the codebook, and $W_2$ represents a coefficient corresponding to the base and may be expressed as:

$$W_2 = \begin{pmatrix} \alpha_{11} & \Lambda & \alpha_{1L} \\ M & O & M \\ \alpha_{K1} & \Lambda & \alpha_{KL} \end{pmatrix}$$

$\alpha_{ij}$ is a coefficient used to indicate amplitude information and phase information, $i \in \{1,L,K\}$, $j \in \{1,L,L\}$, and L is a quantity of transport layers of a user signal.

The following descriptions are provided by using the following two-level codebook structure as an example.

$$W = W_1 W_2$$
$$= \begin{bmatrix} p_0 b_0, p_1 b_1, p_2 b_2, p_3 b_3 & 0 \\ & p_4 b_0, p_5 b_1, p_6 b_2, p_7 b_3 \end{bmatrix}$$
$$\begin{bmatrix} 1 \\ c_1 \\ c_2 \\ c_3 \\ c_4 \\ c_5 \\ c_6 \\ c_7 \end{bmatrix}$$

-continued $$= \begin{bmatrix} p_0b_0 + p_1c_1b_1 + p_2c_2b_2 + p_3c_3b_3 \\ p_4c_4b_0 + p_5c_5b_1 + p_6c_6b_2 + p_7c_7b_3 \end{bmatrix}$$

$b_i$ is used to represent a beam selected by using CSI currently fed back when the beam combination mechanism is used, $c_j$ is a coefficient, mainly including amplitude information and phase information, and $p_j$ is used to assist in indicating amplitude information of the coefficient.

It should be understood that an advantage of using the two-level codebook structure is that overheads can be reduced, $p_j$ is a wideband long-term parameter, and may be kept consistent on entire uplink bandwidth and be notified once at an interval of a relatively long period, and $c_j$ is a subband short-term parameter, and may be notified once at an interval of a relatively short period on narrowband. However, this is not limited in this embodiment of this application.

Specifically, the terminal device may split a codebook W of the CSI into two levels of CSI for reporting, as shown below:

$$W = W_1^{basic} W_2^{basic} + W_1^{enhanced} W_2^{enhanced} =$$

$$\begin{bmatrix} p_0b_0 + p_1c_1b_1 \\ p_4c_4b_0 + p_5c_5b_1 \end{bmatrix} + \begin{bmatrix} p_2c_2b_2 + p_3c_3b_3 \\ p_6c_6b_2 + p_7c_7b_3 \end{bmatrix}$$

Information of CSI reported based on beams $b_0$ and $b_1$ may be referred to as information of basic CSI, and information of CSI reported based on the beams $b_2$ and $b_3$ may be referred to as information of enhanced CSI.

It should be understood that at least one beam used to report the basic CSI is a beam corresponding to CSI with the largest amount of information in CSI of all beams. Therefore, the basic CSI includes main information of CSI obtained through current measurement. If there is one beam used to report the basic CSI, the beam is an optimal beam in a beam selection reporting technology. Details are not described herein. At least one beam used to report the enhanced CSI may be selected by the terminal device from remaining beams other than the beam used to report the basic CSI, to supplement the information of the basic CSI, so that the network device can obtain higher-precision CSI, and CSI feedback quality can be significantly improved.

Therefore, in a CSI hierarchical reporting technology, the terminal device may first report the basic CSI and then report the enhanced CSI. As the terminal device reports more CSI, CSI reporting precision is improved, and accuracy of the channel state measured by the network device is improved.

When the CSI is reported hierarchically, the terminal device may report information of a part of the CSI at different moments. For example, the terminal device may report the information of the basic CSI at a moment $T_0$, report information of first enhanced CSI at a moment $T_0+\Delta T$, report information of second enhanced CSI at a moment $T_0+2*\Delta T$, and the rest are deduced by analogy, until all CSI information is reported. However, because the channel may be changed at any time, the information of the basic CSI that is reported by the terminal device at the moment T0 is accurate. Assuming that the channel is changed between the moment $T_0$ and the moment $T_0+\Delta T$, the information of the first enhanced CSI that is reported by the terminal device at the moment $T_0+\Delta T$ is inaccurate. In this way, continuing to report the information of the first enhanced CSI and the information of the second enhanced CSI are meaningless, and consequently, the CSI finally determined by the network device cannot accurately reflect the channel state.

However, in an existing hierarchical CSI reporting method, beam information that needs to be reported at a plurality of subsequent moments is preconfigured by the network device and the terminal device, and the network device and the terminal device cannot change reported CSI content at each moment. In view of this, this embodiment of this application provide the concept of reporting type of the CSI, so that the reported CSI content at each moment is no longer fixed, and the reported CSI content can be flexibly changed.

Considering that in a CSI hierarchical reporting process, the terminal device needs to report the CSI again when the channel is changed or in another case, three reporting types of the CSI are defined below. However, it should be understood that the reporting types of the CSI may alternatively be other types. This is not limited in this embodiment of this application.

In an optional embodiment, the reporting type is any one of the following types:

a first type, a second type, and a third type, where the first type is used to indicate that the currently reported CSI is CSI in a new reporting period, the second type is used to indicate that the currently reported CSI is incremental information of the CSI of the beam that is previously reported, and the third type is used to indicate that the currently reported CSI is update information of the CSI of the beam that is previously reported.

Specifically, the reporting type of the CSI may include the first type, the second type, and the third type. In this specification, for ease of understanding, the first type is referred to as an independent type, the second type is referred to as an enhanced type, and the third type is referred to as an update type. However, it should be understood that this does not constitute any limitation on the protection scope of the embodiments of this application. The independent type is used to indicate that the terminal device starts new CSI reporting. If the channel state is changed or the network device needs to instruct the terminal device to re-initiate to report the CSI, the reporting type corresponding to the CSI currently reported by the terminal device may be the independent type. The enhanced type is used to indicate that the CSI reported by the terminal device at the current moment is incremental information of the previously reported CSI, to be specific, information of basic CSI has been reported by the terminal device, and the currently reported CSI is information of enhanced CSI and is used to supplement the information of the basic CSI, to improve the CSI reporting precision. The update type is used to indicate that the terminal device needs to update a part of the previously reported CSI. If the channel is partially changed, the reporting type corresponding to the CSI currently reported by the terminal device may be the update type.

Based on the foregoing different reporting types, the CSI reported by the terminal device may be changed in real time. When the channel is not changed, the terminal device may report the information of the basic CSI, report the information of the enhanced CSI on this basis, and indicate to the network device that a corresponding reporting type is the enhanced type, thereby improving the CSI reporting precision. Once the channel is changed, the terminal device may trigger new CSI reporting, or update the CSI of the beam that is currently reported, and indicate to the network device that a corresponding reporting type is the independent type or the update type, thereby improving CSI reporting accuracy.

In an optional embodiment, before the sending, by the terminal device, CSI of N beams to the network device based on the reporting type and a codebook parameter, the method further includes:

determining, by the terminal device, the codebook parameter; and determining, by the terminal device, the currently reported N beams based on the reporting type and the codebook parameter.

Specifically, before reporting the CSI each time, the terminal device needs to determine a beam used at the current moment for reporting the CSI. The terminal device may determine a quantity of pieces of CSI that needs to be reported at the current moment based on the codebook parameter, and then determine, based on the reporting type, a specific beam used for reporting the CSI.

In an optional embodiment, the determining, by the terminal device, the currently reported N beams based on the reporting type and the codebook parameter includes:

if the reporting type is the first type, determining, by the terminal device, to start to report CSI in a new reporting period, and determining beams corresponding to N pieces of CSI as the N beams;

if the reporting type is the second type, determining, by the terminal device, beams corresponding to N pieces of CSI in CSI that is not reported in the current reporting period as the N beams; or if the reporting type is the third type, determining, by the terminal device, beams corresponding to N pieces of CSI that need to be updated in CSI that is already reported in the current reporting period as the N beams.

Correspondingly, the determining, by the network device, a current channel state of a downlink channel based on the reporting type, the codebook parameter, and the CSI of the N beams includes:

if the reporting type is the first type, determining, by the network device, that the terminal device starts a new reporting period, and determining the current channel state based on the CSI of the N beams;

if the reporting type is the second type, aggregating, by the network device, the CSI of the N beams and CSI of a beam that is already reported in the current reporting period, to obtain the current channel state; or if the reporting type is the third type, updating, by the network device, CSI of N beams that is already reported in the current reporting period to the CSI of the N beams that is currently reported by the terminal device, and determining the current channel state based on the updated CSI of the beams.

For ease of understanding, the first type is referred to as the independent type, the second type is referred to as the enhanced type, and the third type is referred to as the update type. Specifically, the following separately describes a case in which the foregoing reporting types are classified into the independent type, the enhanced type, and the update type.

(1) Independent Type

If the reporting type of the CSI is the independent type, the terminal device determines that CSI reporting in a new reporting period needs to be started. First, the terminal device determines that CSI of N beams needs to be currently reported based on the codebook parameter; and then the terminal device determines beams corresponding to N pieces of CSI with the largest amount of information as the N beams that need to be currently reported, and sends the CSI of the N beams to the network device.

Correspondingly, the network device receives the CSI of the N beams that is sent by the terminal device, and determines, based on the reporting type of the current CSI, that the CSI of the N beams that is currently reported by the terminal device is of the independent type; and the network device determines that the terminal device starts new CSI reporting, determines the CSI of the N beams as the information of the basic CSI, and further determines the current channel state.

(2) Enhanced Type

If the reporting type of the CSI is the enhanced type, the terminal device determines to report the information of the enhanced CSI. First, the terminal device determines that CSI of N beams needs to be currently reported based on the codebook parameter; and then the terminal device determines beams corresponding to N pieces of CSI with the largest amount of information in CSI that is not reported in the current reporting period as the N beams required for the current reporting, and sends the CSI of the N beams to the network device.

Correspondingly, the network device receives the CSI of the N beams that is sent by the terminal device, and determines, based on the reporting type of the current CSI, that the CSI of the N beams that is currently reported by the terminal device is of the enhanced type; and the network device determines the CSI of the N beams as the information of the enhanced CSI, and further determines the current channel state with reference to the information of the basic CSI that is previously reported by the terminal device.

(3) Update Type

If the CSI reporting type is the update type, the terminal device determines that a part of CSI reported in the current reporting period needs to be updated. First, the terminal device determines that CSI of N beams needs to be currently reported based on the codebook parameter; and then the terminal device determines beams corresponding to N pieces of CSI that need to be updated in CSI that is already reported in the current reporting period as the N beams required for the current reporting, and sends the CSI of the N beams to the network device.

Correspondingly, the network device receives the CSI of the N beams that is sent by the terminal device, and determines, based on the reporting type of the current CSI, that the CSI of the N beams that is currently reported by the terminal device is of the update type; and the network device updates the CSI of the N beams that is already reported in the current reporting period to the CSI of the N beams that is currently reported by the terminal device, and further determines the current channel state.

It should be understood that the foregoing reporting type of the CSI is negotiated by the network device and the terminal device together before the terminal device reports the CSI each time, to be specific, the reporting type of the CSI that is determined by the network device needs to be the same as that determined by the terminal device. In this way, the CSI reported by the terminal device can be correctly processed by the terminal device. In this embodiment of this application, the network device and the terminal device may determine the reporting type of the CSI in a plurality of manners. Specifically, the reporting type may be determined by the terminal device and notified to the network device, or may be determined by the network device and notified to the terminal device. This is not limited in this embodiment of this application.

In an optional embodiment, the determining, by a terminal device, a reporting type of channel state information (CSI) includes:

determining, by the terminal device, the reporting type based on a downlink channel state; and the method further includes:

sending, by the terminal device to the network device based on the reporting type, a flag bit used to indicate the reporting type.

Correspondingly, the determining, by a network device, the reporting type of the channel state information (CSI) of the terminal device includes:

receiving, by the network device, a flag bit sent by the terminal device, where the flag bit is used to indicate the reporting type; and determining, by the network device, the reporting type based on the flag bit.

Specifically, in embodiments, the terminal device may determine the foregoing reporting type based on a change of the downlink channel. For example, if the downlink channel is greatly changed, the terminal device may determine that the reporting type is the independent type; if the downlink channel is not changed, the terminal device may determine that the reporting type is the enhanced type; or if the downlink channel is slightly changed, the terminal device may determine that the reporting type is the update type. After determining the reporting type, the terminal device may send the reporting type to the network device, and the network device receives the reporting type sent by the terminal device, to determine the reporting type of the CSI currently reported by the terminal device, and correctly process the CSI.

In a possible implementation for example, the terminal device may send the flag bit to the network device, to indicate the reporting type of the currently reported CSI. Specifically, there is a preset correspondence between the flag bit and the reporting type. For example, the independent type corresponds to 00, the enhanced type corresponds to 01, and the update type corresponds to 11. After determining that the reporting type is the independent type, the terminal device may determine that the flag bit is 00 based on the correspondence between the reporting type and the flag bit, and send 00 to the network device. After receiving the flag bit 00, the network device may determine that the reporting type is the independent type based on the correspondence between the reporting type and the flag bit.

It should be understood that the foregoing case in which two bits are used to represent the flag bit is merely used as an example for description. The flag bit in this embodiment of this application may alternatively be represented by using another bit or another character. This is not limited in this embodiment of this application.

In an optional embodiment, the determining, by a network device, the reporting type of the channel state information (CSI) of the terminal device includes:

when the reporting type is the first type or the second type, determining, by the network device, the reporting type based on the CSI of the beam that is previously reported; and after the determining, by the network device, the reporting type based on the CSI of the beam that is previously reported, the method further includes:

sending, by the network device to the terminal device based on the reporting type, the flag bit used to indicate the reporting type.

Correspondingly, before the sending, by the terminal device, CSI of N beams to the network device based on the reporting type and a codebook parameter, the method further includes:

receiving, by the terminal device, the flag bit sent by the network device, where the flag bit is used to indicate the reporting type; and determining, by the terminal device, the reporting type based on the flag bit.

Specifically, in embodiments, the network device may determine the foregoing reporting type based on the CSI of the beam that is previously reported by the terminal device in the current reporting period. For example, if the network device determines that the previously reported CSI is useless, new CSI reporting needs to be started, and the network device may determine that the reporting type is the independent type (namely, the foregoing first type); or if the network device determines that the previously reported CSI is inaccurate, the network device may determine that the reporting type is the enhanced type (namely, the foregoing second type). After determining the reporting type, the network device may send the reporting type to the terminal device, and the terminal device receives the reporting type sent by the network device, to determine the reporting type of the CSI currently reported by the terminal device, and select correct CSI for reporting.

In a possible implementation for example, the network device may send the flag bit to the terminal device, to indicate the reporting type of the currently reported CSI. Specifically, there is a preset correspondence between the flag bit and the reporting type. For example, the independent type corresponds to 00, the enhanced type corresponds to 01, and the update type corresponds to 11. After determining that the reporting type is the independent type, the network device may determine that the flag bit is 00 based on the correspondence between the reporting type and the flag bit, and send 00 to the terminal device. After receiving the flag bit 00, the terminal device may determine that the reporting type is the independent type based on the correspondence between the reporting type and the flag bit.

It should be understood that the foregoing case in which two bits are used to represent the flag bit is merely used as an example for description. The flag bit in this embodiment of this application may alternatively be represented by using another bit or another character. This is not limited in this embodiment of this application.

In an optional embodiment, before the determining, by the network device, a current channel state of a downlink channel based on the codebook parameter, the reporting type, and the CSI of the N beams, the method further includes:

determining, by the network device, the codebook parameter; and sending, by the network device, the codebook parameter to the terminal device when the reporting type is the first type or the second type.

Correspondingly, before the sending, by the terminal device, CSI of N beams to the network device based on the reporting type and a codebook parameter includes:

when the reporting type is the first type or the second type, receiving, by the terminal device, the codebook parameter sent by the network device.

In an optional embodiment, after the determining, by the terminal device, the codebook parameter, the method further includes:

sending, by the terminal device, the codebook parameter to the network device.

Correspondingly, before the determining, by the network device, a current channel state of a downlink channel based on the codebook parameter, the reporting type, and the CSI of the N beams, the method further includes:

receiving, by the network device, the codebook parameter sent by the terminal device.

Specifically, in embodiments, when the CSI is reported by using a codebook, the terminal device and the network device not only need to determine the reporting type of the current CSI, but also need to determine the codebook parameter used by the currently reported CSI. The codebook parameter may be determined by the network device and notified to the terminal device, or may be determined by the terminal device and notified to the network device. This is not limited in this embodiment of this application.

It should be understood that only when the reporting type is the independent type (namely, the foregoing first type) or the enhanced type (namely, the foregoing second type), the network device can actively change reported CSI content, to be specific, actively determine the reporting type of the CSI and the codebook parameter, and send the reporting type of the CSI and the codebook parameter to the terminal device. However, when the reporting type is the update type (namely, the foregoing third type), because the network device cannot learn of the channel state, only the terminal device can actively initiate CSI reporting of the update type. In this case, the codebook parameter corresponding to the update type can be determined by only the terminal device, and notified to the network device.

In an optional embodiment, the CSI includes at least one of the following information: a precoding matrix indicator PMI, a rank indication RI, and a channel quality indication CQI.

Specifically, the channel state information (CSI) fed back by the terminal device to the network device may include at least one of a rank indication (RI), a precoding matrix indicator (PMI), and a channel quality indication (CQI). The RI identifies a quantity of layers available for spatial transmission at a transmit end; the PMI identifies a codebook index of an optimal precoding matrix; and the CQI is channel quality achieved when the RI/PMI is reported, and is used by the transmit end to select a modulation mode and a coding rate for transmission.

It should be understood that the CSI may further include other information. For example, in a beam combination reporting technology, the CSI further includes coefficient quantization information. This is not limited in this embodiment of this application.

For ease of understanding, the data transmission method in this embodiment of this application is described in detail below with reference to three possible implementations.

Manner 1

(1) First Moment

The terminal device may select an optimal beam $b_0$ from a plurality of alternative beams based on a beam selection reporting technology, and send CSI of the beam $b_0$ to the network device. In this case, a quantity of total beams that are reported by the terminal device and that are used to indicate CSI (referred to as UE CSI for short below) of a current measurement result is L=1.

Correspondingly, the network device receives the CSI of the beam $b_0$ that is reported by the terminal device, determines the channel state of the current downlink channel based on the CSI of the beam $b_0$, and performs data transmission based on the channel state.

(2) Second Moment

The terminal device determines a flag bit of currently reported CSI. The flag bit is used to indicate a reporting type of the current CSI, and the terminal device sends the flag bit to the network device. The terminal device determines, based on the flag bit, that the reporting type of the CSI at the second moment is the enhanced type, the terminal device selects a beam $b_1$ from remaining alternative beams other than the beam $b_0$, and sends CSI of the beam $b_1$ to the network device. In this case, a quantity of total beams that are reported by the terminal device and that are used to indicate the UE CSI is L=2.

Correspondingly, the network device receives the CSI the beam $b_1$ that is reported by the terminal device, and receives the flag bit that is sent by the terminal device and that is used to indicate the reporting type of the current CSI. The network device determines, by using the received flag bit, that the reporting type of the CSI reported by the terminal device at the second moment is the enhanced type, aggregates the CSI of the beam $b_1$ and the CSI of the beam $b_0$, to obtain the channel state of the current downlink channel, and performs data transmission based on the channel state.

Manner 2

(1) First Moment

The terminal device may select, based on a beam combination reporting technology, two beams $b_0$ and $b_1$ corresponding to CSI with the largest amount of information from a plurality of alternative beams, and send the CSI of the beams $b_0$ and $b_1$ to the network device. In this case, a quantity of total beams that are reported by the terminal device and that are used to indicate UE CSI is L=2.

Correspondingly, the network device receives the CSI of the beams $b_0$ and $b_1$ that is reported by the terminal device, determines the channel state of the current downlink channel based on the CSI of the beams $b_0$ and $b_1$, and performs data transmission based on the channel state.

(2) Second Moment

The terminal device determines a flag bit of currently reported CSI. The flag bit is used to indicate a reporting type of the current CSI, and the terminal device sends the flag bit to the network device. The terminal device determines, based on the flag bit, that the reporting type of the CSI at the second moment is the enhanced type, and the terminal device selects two beams $b_2$ and $b_3$ from remaining alternative beams other than the beams $b_0$ and $b_1$, and sends CSI of the beams $b_2$ and $b_3$ to the network device. In this case, a quantity of total beams that are reported by the terminal device and that are used to indicate the UE CSI is L=4;

Correspondingly, the network device receives the CSI of the beams $b_2$ and $b_3$ that is reported by the terminal device, and receives the flag bit that is sent by the terminal device and that is used to indicate the reporting type of the current CSI. The network device determines, by using the received flag bit, that the reporting type of the CSI reported by the terminal device at the second moment is the enhanced type, aggregates the CSI of the beams $b_2$ and $b_3$ and the CSI of the beams $b_0$ and $b_1$, to obtain the channel state of the current downlink channel, and performs data transmission based on the channel state.

(3) Third Moment

The terminal device determines a flag bit of currently reported CSI. The flag bit is used to indicate a reporting type of the current CSI, and the terminal device sends the flag bit to the network device. The terminal device determines, based on the flag bit, that the reporting type of the CSI at the third moment is the enhanced type, and the terminal device selects two beams $b_4$ and $b_5$ from remaining alternative beams other than the beams $b_0$, $b_1$, $b_2$, and $b_3$, and sends CSI of the beams $b_4$ and $b_5$ to the network device. In this case, a quantity of total beams that are reported by the terminal device and that are used to indicate the UE CSI is L=6.

Correspondingly, the network device receives the CSI of the beams $b_4$ and $b_5$ that is reported by the terminal device, and receives the flag bit that is sent by the terminal device and that is used to indicate the reporting type of the current CSI. The network device determines, by using the received flag bit, that the reporting type of the CSI reported by the terminal device at the third moment is the enhanced type, aggregates the CSI of the beams $b_4$ and $b_5$ and the CSI of the beams $b_0$, $b_1$, $b_2$, and $b_3$, to obtain the channel state of the current downlink channel, and performs data transmission based on the channel state.

In this way, as the terminal device reports more CSI, the network device may obtain more accurate CSI, so that CSI feedback quality can be significantly improved.

Manner 3

(1) First Moment

The terminal device may select, based on a beam combination reporting technology, two beams $b_0$ and $b_1$ corresponding to CSI with the largest amount of information from a plurality of alternative beams, and send the CSI of the beams $b_0$ and $b_1$ to the network device. In this case, a quantity of total beams that are reported by the terminal device and that are used to indicate UE CSI is L=2.

Correspondingly, the network device receives the CSI of the beams $b_0$ and $b_1$ that is reported by the terminal device, determines the channel state of the current downlink channel based on the CSI of the beams $b_0$ and $b_1$, and performs data transmission based on the channel state.

(2) Second Moment

The terminal device determines a flag bit of currently reported CSI. The flag bit is used to indicate a reporting type of the current CSI, and the terminal device sends the flag bit to the network device. The terminal device determines, based on the flag bit, that the reporting type of the CSI at the second moment is the enhanced type, and the terminal device selects two beams $b_2$ and $b_3$ from remaining alternative beams other than the beams $b_0$ and $b_1$, and sends CSI of the beams $b_2$ and $b_3$ to the network device. In this case, a quantity of total beams that are reported by the terminal device and that are used to indicate the UE CSI is L=4;

Correspondingly, the network device receives the CSI of the beams $b_2$ and $b_3$ that is reported by the terminal device, and receives the flag bit that is sent by the terminal device and that is used to indicate the reporting type of the current CSI. The network device determines, by using the received flag bit, that the reporting type of the CSI reported by the terminal device at the second moment is the enhanced type, aggregates the CSI of the beams $b_2$ and $b_3$ and the CSI of the beams $b_0$ and $b_1$, to obtain the channel state of the current downlink channel, and performs data transmission based on the channel state.

(3) Third Moment

The terminal device determines a flag bit of currently reported CSI. The flag bit is used to indicate a reporting type of the current CSI, and the terminal device sends the flag bit to the network device. The terminal device determines, based on the flag bit, that the reporting type of the CSI at the third moment is the enhanced type, and the terminal device determines to trigger new CSI reporting, re-measures the channel state, selects six beams $b_0$ to $b_5$ corresponding to CSI with the largest amount of information from a plurality of alternative beams, and sends the CSI of the beams $b_0$ to $b_5$ at the current moment to the network device. In this case, a quantity of total beams that are reported by the terminal device and that are used to indicate the UE CSI is L=6.

Correspondingly, the network device receives the CSI of the beams $b_0$ to $b_5$ that is reported by the terminal device, and receives the flag bit that is sent by the terminal device and that is used to indicate the reporting type of the current CSI. The network device determines, by using the received flag bit, that the reporting type of the CSI reported by the terminal device at the third moment is the independent type, determines that the terminal device starts a new reporting period, determines the channel state of the current downlink channel based on the CSI of the beams $b_0$ to $b_5$, and performs data transmission based on the channel state.

(3) Fourth Moment

The terminal device determines a flag bit of currently reported CSI. The flag bit is used to indicate a reporting type of the current CSI, and the terminal device sends the flag bit to the network device. The terminal device determines, based on the flag bit, that the reporting type of the CSI at the fourth moment is the update type, and the terminal device selects beams $b_4$ and $b_5$ from the beams $b_0$ to $b_5$ that have been reported in the reporting period but whose CSI is changed, and sends the CSI of the beams $b_4$ and $b_5$ to the network device. In this case, a quantity of total beams that are reported by the terminal device and that are used to indicate the UE CSI is L=6.

Correspondingly, the network device receives the CSI of the beams $b_4$ and $b_5$ that is reported by the terminal device, and receives the flag bit that is sent by the terminal device and that is used to indicate the reporting type of the current CSI. The network device determines, by using the received flag bit, that the reporting type of the CSI reported by the terminal device at the fourth moment is the update type, updates the CSI of the beams $b_4$ and $b_5$ that is reported by the terminal device at the third moment, determines the channel state of the current downlink channel based on the updated CSI of the beams $b_0$ to $b_5$, and performs data transmission based on the channel state.

In this embodiment of this application, the CSI reported by the terminal device may be changed in real time. Once the channel is changed, the terminal device may trigger new CSI reporting, or update the CSI of the beam that is currently reported, thereby improving accuracy of the CSI reporting.

It should be understood that all the foregoing moments are preconfigured CSI reporting moments. In addition, the second moment is later than the first moment, the third moment is later than the second moment, and the fourth moment is later than the third moment.

According to the data transmission method in the embodiments of this application, the flag bit is set to indicate the reporting type of the CSI at the current moment, so that the network device or the terminal device can adjust, based on an actual situation, the CSI reported at the current moment, to meet a continuously changing requirement for the channel, thereby improving CSI reporting flexibility.

It should be understood that sequence numbers of the foregoing processes do not indicate an execution sequence. The execution sequence of the processes should be determined based on functions and internal logic of the processes, and should not be construed as any limitation on the implementation processes of the embodiments of this application.

The data transmission method according to the embodiments of this application is described in detail above with reference to FIG. 1 and FIG. 2, and the terminal device and the network device according to the embodiments of this application are described in detail below with reference to FIG. 3 to FIG. 6.

Figure 3:
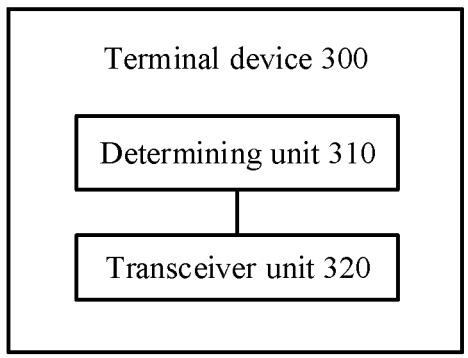
FIG. 3 is a schematic block diagram of a terminal device according to an embodiment of this application.

FIG. 3 shows a terminal device 300 according to an embodiment of this application. The terminal device 300 includes: a determining unit 310 and a transceiver unit 320.

The determining unit 310 is configured to determine a reporting type of channel state information (CSI), where the reporting type is used to indicate a relationship between CSI of a beam that is currently reported by the terminal device and CSI of a beam that is previously reported by the terminal device in a current reporting period.

The transceiver unit 320 is configured to send CSI of N beams to the network device based on the reporting type and a codebook parameter, where the codebook parameter is used to indicate a quantity N of the currently reported beams, and N is an integer greater than or equal to 1.

According to the terminal device in this embodiment of this application, the terminal device and the network device negotiate the reporting type of the CSI, so that the terminal device can send the CSI corresponding to the negotiated reporting type to the network device, and the network device or the terminal device can adjust, based on an actual situation, the currently reported CSI, to meet a continuously changing requirement for the channel, thereby improving CSI reporting flexibility and improving system performance.

Optionally, the reporting type is any one of the following types: a first type, a second type, and a third type, where the first type is used to indicate that the currently reported CSI is CSI in a new reporting period, the second type is used to indicate that the currently reported CSI is incremental information of the CSI of the beam that is previously reported; and the third type is used to indicate that the currently reported CSI is update information of the CSI of the beam that is previously reported.

Optionally, the determining unit 310 is further configured to: before sending the CSI of the N beams to the network device based on the reporting type and the codebook parameter, determine the codebook parameter; and determine the currently reported N beams based on the reporting type and the codebook parameter.

Optionally, the determining unit 310 is specifically configured to: if the reporting type is the first type, determine to start to report CSI in a new reporting period, and determine beams corresponding to N pieces of CSI as the N beams; if the reporting type is the second type, determine beams corresponding to N pieces of CSI in CSI that is not reported in the current reporting period as the N beams; or if the reporting type is the third type, determine beams corresponding to N pieces of CSI that need to be updated in CSI that is already reported in the current reporting period as the N beams.

Optionally, the determining unit 310 is specifically configured to: determine the reporting type based on a downlink channel state; and the transceiver unit 320 is further configured to: send, to the network device based on the reporting type, a flag bit used to indicate the reporting type.

Optionally, the transceiver unit 320 is further configured to: when the reporting type is the first type or the second type, receive a flag bit sent by the network device, where the flag bit is used to indicate the reporting type; and the determining unit 310 is specifically configured to: determine the reporting type based on the flag bit.

Optionally, the transceiver unit 320 is further configured to: before sending the CSI of the N beams to the network device based on the reporting type and the codebook parameter, receive, when the reporting type is the first type or the second type, the codebook parameter sent by the network device.

Optionally, the transceiver unit 320 is further configured to: after determining the codebook parameter, send the codebook parameter to the network device.

It should be understood that the terminal device 300 herein is embodied in a form of a functional unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the terminal device 300 may be specifically the terminal device in the foregoing embodiment, and the terminal device 300 may be configured to perform the procedures and/or steps corresponding to the terminal device in the foregoing method embodiment. To avoid repetition, details are not described herein again.

Figure 4:
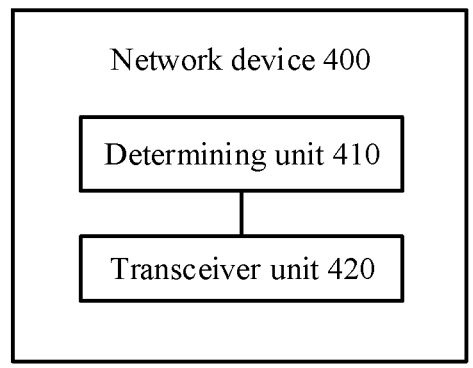
FIG. 4 is a schematic block diagram of a network device according to an embodiment of this application.

FIG. 4 shows a network device 400 according to an embodiment of this application. The network device 400 includes: a determining unit 410 and a transceiver unit 420.

The determining unit 410 is configured to determine a reporting type of channel state information (CSI) of a terminal device, where the reporting type is used to indicate a relationship between CSI of a beam that is currently reported by the terminal device and CSI of a beam that is previously reported by the terminal device in a current reporting period.

The transceiver unit 420 is configured to receive CSI of N beams that is sent by the terminal device, where N is an integer greater than or equal to 1.

The determining unit 410 is further configured to:
determine a current channel state of a downlink channel based on a codebook parameter, the reporting type, and the CSI of the N beams, where the codebook parameter is used to indicate a quantity N of beams currently reported by the terminal device.

According to the network device in this embodiment of this application, the terminal device and the network device negotiate the reporting type of the CSI, so that the terminal device may send the CSI corresponding to the negotiated reporting type to the network device, and the network device or the terminal device can adjust, based on an actual situation, the currently reported CSI, to meet a continuously changing requirement for the channel, thereby improving CSI reporting flexibility and improving system performance.

Optionally, the reporting type is any one of the following types: a first type, a second type, and a third type, where the first type is used to indicate that the currently reported CSI is CSI in a new reporting period, the second type is used to indicate that the currently reported CSI is incremental information of the CSI of the beam that is previously reported; and the third type is used to indicate that the currently reported CSI is update information of the CSI of the beam that is previously reported.

Optionally, the determining unit 410 is specifically configured to: if the reporting type is the first type, determine that the terminal device starts a new reporting period, and determine the current channel state based on the CSI of the N beams; if the reporting type is the second type, aggregate the CSI of the N beams and CSI of a beam that is already reported in the current reporting period, to obtain the current channel state; or if the reporting type is the third type, update CSI of N beams that is reported in the current reporting period to the CSI of the N beams that is currently reported by the terminal device, and determine the current channel state based on the updated CSI of the beams.

Optionally, the determining unit 410 is specifically configured to: when the reporting type is the first type or the second type, determine the reporting type based on the CSI of the beam that is previously reported; and the transceiver unit 420 is further configured to: send, to the terminal device based on the reporting type, a flag bit used to indicate the reporting type.

Optionally, the transceiver unit 420 is further configured to: receive a flag bit sent by the terminal device, where the flag bit is used to indicate the reporting type; and the determining unit 410 is specifically configured to: determine the reporting type based on the flag bit.

Optionally, the determining unit 410 is further configured to: before determining the current channel state of the downlink channel based on the codebook parameter, the reporting type, and the CSI of the N beams, determine the codebook parameter; and the transceiver unit 420 is further configured to: send the codebook parameter to the terminal device when the reporting type is the first type or the second type.

Optionally, the transceiver unit 420 is further configured to: before determining the current channel state of the downlink channel based on the codebook parameter, the reporting type, and the CSI of the N beams, receive the codebook parameter sent by the terminal device.

It should be understood that the network device 400 herein is embodied in a form of a functional unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the network device 400 may be specifically the network device in the foregoing embodiment, and the network device 400 may be configured to perform the procedures and/or steps corresponding to the network device in the foregoing method embodiment. To avoid repetition, details are not described herein again.

Figure 5:
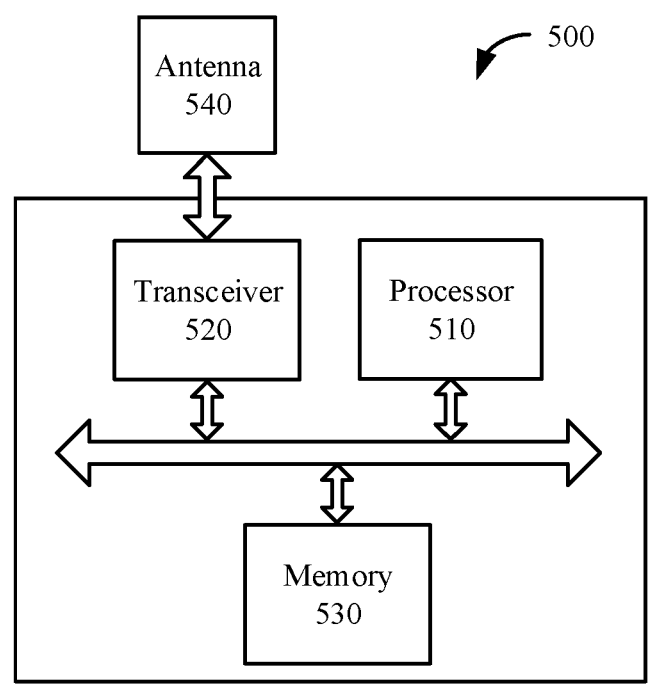
FIG. 5 is a schematic block diagram of another network device according to an embodiment of this application.

FIG. 5 shows another network device 500 according to an embodiment of this application. The network device 500 includes a processor 510, a transceiver 520, and a memory 530. The processor 510, the transceiver 520, and the memory 530 communicate with each other by using an internal connection path, the memory 530 is configured to store an instruction, and the processor 510 is configured to execute the instruction stored in the memory 530, to control the transceiver 520 to send a signal and/or receive a signal.

When a the instruction stored in the memory 530 is executed by the processor 510, the processor 510 is configured to determine a reporting type of channel state information (CSI) of a terminal device, where the reporting type is used to indicate a relationship between CSI of a beam that is currently reported by the terminal device and CSI of a beam that is previously reported by the terminal device in a current reporting period; receive, by using the transceiver 520, CSI of N beams that is sent by the terminal device, where N is an integer greater than or equal to 1; and the processor 510 is further configured to determine a current channel state of a downlink channel based on a codebook parameter, the reporting type, and the CSI of the N beams, where the codebook parameter is used to indicate a quantity N of beams currently reported by the terminal device.

The processor 510 and the memory 530 may be integrated into one processing apparatus. The processor 510 is configured to execute the instruction stored in the memory 530, to implement the foregoing functions. During specific implementation, the memory 530 may alternatively be integrated into the processor 510, or may be independent of the processor 510.

The foregoing network device 500 may further include an antenna 540 that is configured to send, by using a radio signal, downlink data or downlink control signaling output by the transceiver 520. It should be understood that the network device 500 may be specifically the network device in the foregoing embodiment 200, and may be configured to perform the steps and/or procedures corresponding to the network device in the foregoing method embodiment. Optionally, the memory 530 may include a read-only memory and a random access memory, and provide an instruction and data to the processor. A part of the memory may further include a non-volatile random access memory. For example, the memory may further store information of a device type. The processor 510 may be configured to execute the instruction stored in the memory, and when executing the instruction stored in the memory, the processor 510 is configured to perform the steps and/or procedures of the foregoing method embodiment corresponding to the network device.

Figure 6:
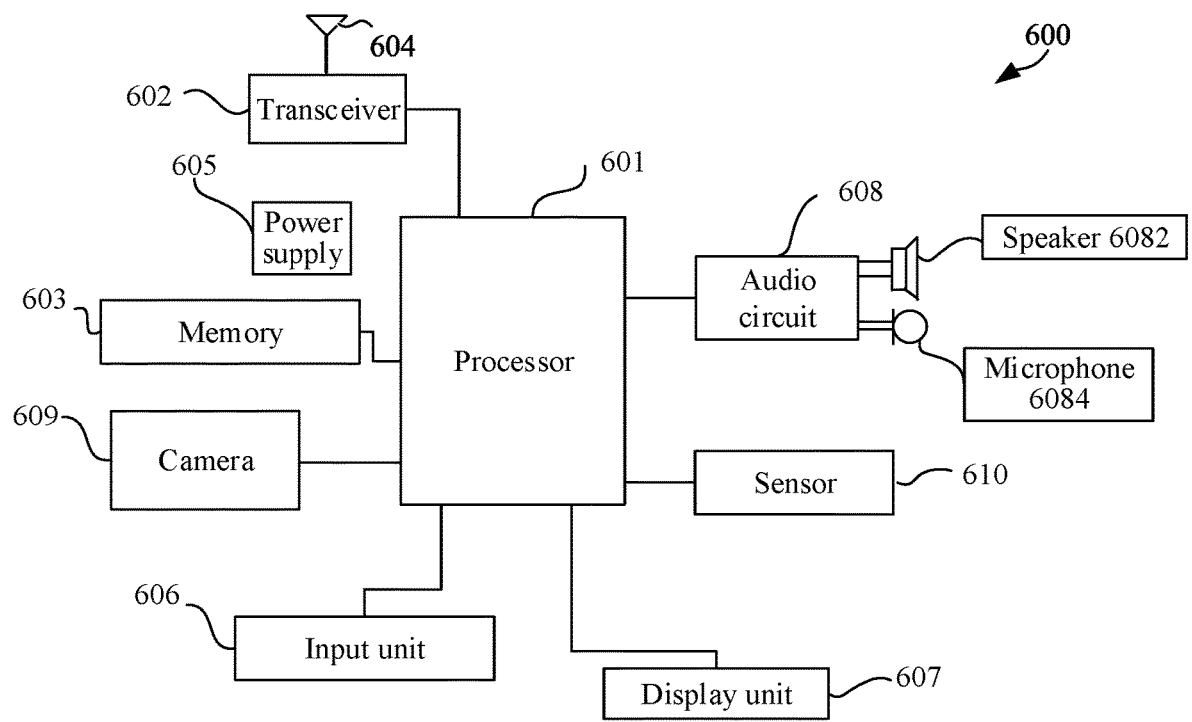
FIG. 6 is a schematic block diagram of another terminal device according to an embodiment of this application.

FIG. 6 shows another terminal device 600 according to an embodiment of this application. As shown in FIG. 6, the terminal device 600 includes a processor 601 and a transceiver 602, and optionally, the terminal device 600 further includes a memory 603. The processor 602, the transceiver 602, and the memory 603 communicate with each other by using an internal connection path, to transfer a control signal and/or a data signal. The memory 603 is configured to store a computer program. The processor 601 is configured to invoke the computer program from the memory 603 and run the computer program, to control the transceiver 602 to send/receive a signal.

When the computer instruction stored in the memory 603 is executed by the processor 601, the processor 601 is configured to: determine a reporting type of channel state information (CSI), where the reporting type is used to indicate a relationship between CSI of a beam that is currently reported and CSI of a beam that is previously reported in a current reporting period, and send CSI of N beams to a network device by using the transceiver 602 based on the reporting type and a codebook parameter, where the codebook parameter is used to indicate a quantity N of currently reported beams, and N is an integer greater than or equal to 1.

The processor 601 and the memory 603 may be integrated into one processing apparatus. The processor 601 is configured to execute the computer program stored in the memory 603, to implement the foregoing functions. During specific implementation, the memory 603 may alternatively be integrated into the processor 601, or may be independent of the processor 601. The terminal device 600 may further include an antenna 604 that is configured to send, by using a radio signal, uplink data or uplink control signaling output by the transceiver 602.

It should be understood that the terminal device 600 may be specifically the terminal device in the foregoing embodiment 200, and may be configured to perform the steps and/or procedures corresponding to the terminal device in the foregoing method embodiment 200. Optionally, the memory 630 may include a read-only memory and a random access memory, and provide an instruction and data to the processor. A part of the memory may further include a non-volatile random access memory. For example, the memory may further store information of a device type. The processor 610 may be configured to execute the instruction stored in the memory, and when executing the instruction stored in the memory, the processor 610 is configured to perform the steps and/or procedures in the method embodiment corresponding to the terminal device.

The processor 601 may be configured to perform an action that is internally implemented by the terminal device and that is described in the foregoing method embodiment, and the transceiver 602 may be configured to perform an action, described in the foregoing method embodiment, of performing transmission or sending by the terminal device to the network device. For details, refer to the descriptions in the foregoing method embodiment. Details are not described herein again.

The terminal device 600 may further include a power supply 606 that is configured to supply power to various devices or circuits in the terminal device 600.

In addition, to make functions of the terminal device more perfect, the terminal device 600 may further include one or more of an input unit 606, a display unit 607, an audio circuit 608, a camera 609, a sensor 610, and the like, and the audio circuit 608 may further include a speaker 6082, a microphone 6084, and the like.

It should be understood that in the embodiments of this application, the processor in the network device 500 and the terminal device 600 may be a central processing unit (CPU), or the processor 610 may alternatively be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor, or the processor may be any conventional processor or the like.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps in the foregoing method in combination with the hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the method steps and units that are described with the embodiments disclosed in this specification can be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   determining, by a terminal device, a reporting type of channel state information (CSI), wherein the reporting type indicates a relationship between CSI of a beam that is currently reported by the terminal device and CSI of a beam that is previously reported by the terminal device in a current reporting period; and sending, by the terminal device, CSI of N beams to a network device based on the reporting type and a codebook parameter, wherein the codebook parameter indicates a quantity N of the currently reported beams, and N is an integer greater than or equal to 1, wherein before the sending CSI of N beams to the network device, the method further comprises:

determining, by the terminal device, the codebook parameter, sending, by the terminal device after the codebook parameter is determined, the codebook parameter to the network device, and determining, by the terminal device, the currently reported N beams based on the reporting type and the codebook parameter.

2. The data transmission method according to claim 1, wherein the reporting type is any one of the following types:

a first type that indicates that the currently reported CSI is CSI in a new reporting period, a second type that indicates that the currently reported CSI is incremental information of the CSI of the beam that is previously reported, and a third type that indicates that the currently reported CSI is update information of the CSI of the beam that is previously reported.

3. The data transmission method according to claim 2, wherein the determining, by the terminal device, the currently reported N beams based on the reporting type and the codebook parameter comprises:

when the reporting type is the first type, determining, by the terminal device, to start to report CSI in a new reporting period, and determining beams corresponding to N pieces of CSI as the N beams;

when the reporting type is the second type, determining, by the terminal device, beams corresponding to N pieces of CSI in CSI that is not reported in the current reporting period as the N beams; or when the reporting type is the third type, determining, by the terminal device, beams corresponding to N pieces of CSI that need to be updated in CSI that is already reported in the current reporting period as the N beams.

4. The data transmission method according to claim 2, wherein the determining, by the terminal device, the reporting type of CSI comprises:

when the reporting type is the first type or the second type, receiving, by the terminal device, a flag bit sent by the network device, wherein the flag bit indicates the reporting type; and determining, by the terminal device, the reporting type based on the flag bit.

5. The data transmission method according to claim 2, wherein before the sending, by the terminal device, CSI of N beams to the network device based on the reporting type and the codebook parameter, the method further comprises:

when the reporting type is the first type or the second type, receiving, by the terminal device, the codebook parameter sent by the network device.

6. The data transmission method according to claim 1, wherein the determining, by the terminal device, the reporting type of CSI comprises:

determining, by the terminal device, the reporting type based on a downlink channel state; and the method further comprises:

sending, by the terminal device to the network device based on the reporting type, a flag bit that indicates the reporting type.

7. A terminal device for data transmission, comprising:

a processor configured to determine a reporting type of channel state information (CSI), wherein the reporting type indicates a relationship between CSI of a beam that is currently reported by the terminal device and CSI of a beam that is previously reported by the terminal device in a current reporting period;

a transceiver, configured to send CSI of N beams to a network device based on the reporting type and a codebook parameter, wherein the codebook parameter indicates a quantity N of the currently reported beams, and N is an integer greater than or equal to 1;

wherein the processor is further configured to:

before the CSI of the N beams are sent to the network device based on the reporting type and the codebook parameter, determine the codebook parameter, and determine the currently reported N beams based on the reporting type and the codebook parameter; and wherein the transceiver is further configured to:

after the codebook parameter is determined, send the codebook parameter to the network device.

8. The terminal device according to claim 7, wherein the reporting type is any one of the following types:

a first type that indicates that the currently reported CSI is CSI in a new reporting period, a second type that indicates that the currently reported CSI is incremental information of the CSI of the beam that is previously reported, and a third type that indicates that the currently reported CSI is update information of the CSI of the beam that is previously reported.

9. The terminal device according to claim 8, wherein the processor is further configured to:

when the reporting type is the first type, determine to start to report CSI in a new reporting period, and determine beams corresponding to N pieces of CSI as the N beams;

when the reporting type is the second type, determine beams corresponding to N pieces of CSI in CSI that is not reported in the current reporting period as the N beams; or when the reporting type is the third type, determine beams corresponding to N pieces of CSI that need to be updated in CSI that is already reported in the current reporting period as the N beams.

10. The terminal device according to claim 8, wherein transceiver is further configured to:

when the reporting type is the first type or the second type, receive a flag bit sent by the network device, wherein the flag bit indicates the reporting type; and the processor is further configured to:

determine the reporting type based on the flag bit.

11. The terminal device according to claim 8, wherein the transceiver is further configured to:

before sending the CSI of the N beams to the network device based on the reporting type and the codebook parameter, when the reporting type is the first type or the second type, receive the codebook parameter sent by the network device.

12. The terminal device according to claim 7, wherein the processor is further configured to:

determine the reporting type based on a downlink channel state; and the transceiver is further configured to:

send, to the network device based on the reporting type, a flag bit used to indicate the reporting type.

13. A chip for data transmission, comprising: a memory; at least one processor, configured to read an instruction stored in the memory, wherein when the processor executes the instruction, the chip performs operations comprising:

determining a reporting type of channel state information (CSI), wherein the reporting type indicates a relationship between CSI of a beam that is currently reported by a terminal device and CSI of a beam that is previously reported by the terminal device in a current reporting period; and sending CSI of N beams to a network device based on the reporting type and a codebook parameter, wherein the codebook parameter indicates a quantity N of the currently reported beams, and N is an integer greater than or equal to 1, wherein before the sending CSI of N beams to the network device, the operations further comprise:

determining the codebook parameter, sending, after the codebook parameter is determined, the codebook parameter to the network device, and determining the currently reported N beams based on the reporting type and the codebook parameter.

14. The chip according to claim 13, wherein the reporting type is any one of the following types:

a first type that indicates that the currently reported CSI is CSI in a new reporting period, a second type that indicates that the currently reported CSI is incremental information of the CSI of the beam that is previously reported, and a third type that indicates that the currently reported CSI is update information of the CSI of the beam that is previously reported.

15. The chip according to claim 14, wherein determining the currently reported N beams based on the reporting type and the codebook parameter comprises:

when the reporting type is the first type, determining to start to report CSI in a new reporting period, and determining beams corresponding to N pieces of CSI as the N beams;

when the reporting type is the second type, determining beams corresponding to N pieces of CSI in CSI that is not reported in the current reporting period as the N beams; or when the reporting type is the third type, determining beams corresponding to N pieces of CSI that need to be updated in CSI that is already reported in the current reporting period as the N beams.

16. The chip according to claim 14, wherein determining the reporting type of CSI comprises:

when the reporting type is the first type or the second type, receiving a flag bit sent by the network device, wherein the flag bit indicates the reporting type; and determining the reporting type based on the flag bit.

17. The chip according to a claim 14, wherein before the sending CSI of N beams to the network device based on the reporting type and the codebook parameter, the operations further comprise:

when the reporting type is the first type or the second type, receiving the codebook parameter sent by the network device.

18. The chip according to claim 13, wherein determining the reporting type of CSI comprises:

determining the reporting type based on a downlink channel state; and sending, to the network device based on the reporting type, a flag bit that indicates the reporting type.

19. A data transmission method, comprising:

determining, by a network device, a reporting type of channel state information (CSI) of a terminal device, wherein the reporting type indicates a relationship between CSI of a beam that is currently reported by the terminal device and CSI of a beam that is previously reported by the terminal device in a current reporting period;

receiving, by the network device, CSI of N beams that is from the terminal device, wherein N is an integer greater than or equal to 1; and determining, by the network device, a current channel state of a downlink channel based on a codebook parameter, the reporting type, and the CSI of the N beams, wherein the codebook parameter is used to indicate a quantity N of beams currently reported by the terminal device;

wherein before the determining, by the network device, a current channel state of a downlink channel based on a codebook parameter, the reporting type, and the CSI of the N beams, the method further comprises:

receiving, by the network device, the codebook parameter from the terminal device.

20. The data transmission according to claim 19, wherein the reporting type is any one of the following types:

a first type, a second type, and a third type, wherein the first type is used to indicate that the currently reported CSI is CSI in a new reporting period, the second type is used to indicate that the currently reported CSI is incremental information of the CSI of the beam that is previously reported, and the third type is used to indicate that the currently reported CSI is update information of the CSI of the beam that is previously reported.

21. The data transmission method according to claim 20, wherein the determining, by the network device, a current channel state of a downlink channel based on a codebook parameter, the reporting type, and the CSI of the N beams comprises:

if the reporting type is the first type, determining, by the network device, that the terminal device starts a new reporting period, and determining the current channel state based on the CSI of the N beams;

if the reporting type is the second type, aggregating, by the network device, the CSI of the N beams and CSI of a beam that is already reported in the current reporting period, to obtain the current channel state; or if the reporting type is the third type, updating, by the network device, CSI of N beams that is already reported in the current reporting period to the CSI of the N beams that is currently reported by the terminal device, and determining the current channel state based on the updated CSI of the beams.

22. The data transmission method according to claim 20, wherein the determining, by a network device, a reporting type of channel state information CSI of a terminal device comprises:

when the reporting type is the first type or the second type, determining, by the network device, the reporting type based on the CSI of the beam that is previously reported; and the method further comprises:

sending, by the network device to the terminal device based on the reporting type, a flag bit used to indicate the reporting type.

23. The data transmission method according to claim 19, wherein the determining, by a network device, a reporting type of channel state information CSI of a terminal device comprises:

receiving, by the network device, a flag bit from the terminal device, wherein the flag bit is used to indicate the reporting type; and determining, by the network device, the reporting type based on the flag bit.

24. A method device for data transmission, comprising:
a processor configured to determine a reporting type of channel state information (CSI) of a terminal device, wherein the reporting type indicates a relationship between CSI of a beam that is currently reported by the terminal device and CSI of a beam that is previously reported by the terminal device in a current reporting period;
a transceiver, configured to receive CSI of N beams that is from the terminal device, wherein N is an integer greater than or equal to 1;
wherein the processor is further configured to determine a current channel state of a downlink channel based on a codebook parameter, the reporting type, and the CSI of the N beams, wherein the codebook parameter is used to indicate a quantity N of beams currently reported by the terminal device;
wherein the transceiver is further configured to receive, the codebook parameter from the terminal device.

25. The network device according to claim 24, wherein the reporting type is any one of the following types:
a first type, a second type, and a third type, wherein the first type is used to indicate that the currently reported CSI is CSI in a new reporting period, the second type is used to indicate that the currently reported CSI is incremental information of the CSI of the beam that is previously reported, and the third type is used to indicate that the currently reported CSI is update information of the CSI of the beam that is previously reported.

26. The network device according to claim 25, wherein the processor is configured to:
if the reporting type is the first type, determine, that the terminal device starts a new reporting period, and determining the current channel state based on the CSI of the N beams;
if the reporting type is the second type, aggregate, the CSI of the N beams and CSI of a beam that is already reported in the current reporting period, to obtain the current channel state; or if the reporting type is the third type, update, CSI of N beams that is already reported in the current reporting period to the CSI of the N beams that is currently reported by the terminal device, and determining the current channel state based on the updated CSI of the beams.

27. The network device according to claim 25, wherein the processor is configured to:
when the reporting type is the first type or the second type, determine, the reporting type based on the CSI of the beam that is previously reported; and
the transceiver is configured to:
send to the terminal device based on the reporting type, a flag bit used to indicate the reporting type.

28. The network device according to claim 24, wherein the transceiver is configured to: receive, a flag bit from the terminal device, wherein the flag bit is used to indicate the reporting type; and
the processor is configured to: determine, the reporting type based on the flag bit.

29. A chip for data transmission, comprising: a memory; at least one processor, configured to read an instruction stored in the memory, wherein when the at least one processor executes the instruction, the chip performs operations comprising:
determining a reporting type of channel state information (CSI) of a terminal device, wherein the reporting type indicates a relationship between CSI of a beam that is currently reported by the terminal device and CSI of a beam that is previously reported by the terminal device in a current reporting period;
receiving CSI of N beams that is from the terminal device, wherein N is an integer greater than or equal to 1; and
determining a current channel state of a downlink channel based on a codebook parameter, the reporting type, and the CSI of the N beams, wherein the codebook parameter is used to indicate a quantity N of beams currently reported by the terminal device;
wherein before the determining a current channel state of a downlink channel based on a codebook parameter, the reporting type, and the CSI of the N beams, the operations further comprise:
receiving the codebook parameter from the terminal device.

* * * * *